US008811394B2

(12) United States Patent
Xu et al.

(10) Patent No.: US 8,811,394 B2
(45) Date of Patent: Aug. 19, 2014

(54) MESSAGE FORWARDING METHOD, ACCESS POINT, AND SYSTEM

(75) Inventors: Yibin Xu, Nanjing (CN); Bing Sun, Nanjing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 199 days.

(21) Appl. No.: 13/535,596

(22) Filed: Jun. 28, 2012

(65) Prior Publication Data
US 2013/0059530 A1    Mar. 7, 2013

(30) Foreign Application Priority Data

Sep. 6, 2011  (CN) .......................... 2011 1 0262509

(51) Int. Cl.
  *H04L 12/28*  (2006.01)
  *H04M 1/663* (2006.01)
  *H04L 12/58* (2006.01)
  *H04L 12/24* (2006.01)
  *H04W 88/08* (2009.01)

(52) U.S. Cl.
  CPC ............ *H04L 41/0803* (2013.01); *H04L 51/38* (2013.01); *H04W 88/08* (2013.01)
  USPC ...................... 370/389; 455/412.2

(58) Field of Classification Search
  CPC .... H04L 45/00; H04L 12/4641; H04W 88/08
  USPC ................. 370/331, 389, 338, 395.1, 395.31; 709/206, 217; 455/412.1, 412.2, 465
  See application file for complete search history.

(56) References Cited

U.S. PATENT DOCUMENTS

| 7,480,274 B2 * | 1/2009 | Shitama et al. ............... 370/331 |
| 7,996,467 B2 * | 8/2011 | Maes ............................ 709/204 |
| 8,285,798 B2 * | 10/2012 | Wanser et al. ................ 709/206 |
| 8,654,764 B2 * | 2/2014 | Dietterle et al. .............. 370/389 |

(Continued)

FOREIGN PATENT DOCUMENTS

| CN | 101577916 A | 11/2009 |
| CN | 101621802 A | 1/2010 |

(Continued)

OTHER PUBLICATIONS

Extended European Search Report issued in corresponding European Patent Application No. 12175649.8, mailed Nov. 23, 2012.

(Continued)

*Primary Examiner* — Sonny Trinh
(74) *Attorney, Agent, or Firm* — Huawei Technologies Co., Ltd

(57) ABSTRACT

The present disclosure discloses a message forwarding method, an Access Point, and a system. An Access Point obtains a forwarding configuration table, where the forwarding configuration table includes message types and forwarding modes; receives a message sent by a user station and obtains a message type of the message; determines the forwarding mode of the message according to the message type of the message and the forwarding configuration table; encapsulates and forwards the message according to the forwarding mode of the message. Through the present disclosure, forwarding control of messages of wireless users can be implemented on the Access Point, thereby avoiding the problem that wireless air interface control is separated from user access control on an AP controller (AC) in the local forwarding mode and the problem of waste of bandwidth between the AP and the AC in the tunnel forwarding mode.

10 Claims, 3 Drawing Sheets

(56) References Cited

U.S. PATENT DOCUMENTS

| | | | |
|---|---|---|---|
| 2002/0188688 A1* | 12/2002 | Bice et al. | ............... 709/206 |
| 2008/0059579 A1 | 3/2008 | Maes | |
| 2008/0072047 A1 | 3/2008 | Sarikaya et al. | |
| 2008/0112414 A1 | 5/2008 | Beak | |
| 2009/0190522 A1 | 7/2009 | Horn et al. | |
| 2011/0231933 A1* | 9/2011 | Gooch et al. | ............... 726/23 |
| 2012/0008548 A1 | 1/2012 | Suga | |
| 2012/0039230 A1* | 2/2012 | Blanchette et al. | ......... 370/312 |

FOREIGN PATENT DOCUMENTS

| | | |
|---|---|---|
| CN | 102143045 A | 8/2011 |
| RU | 2419981 C2 | 5/2011 |
| WO | 2010004295 A2 | 1/2010 |
| WO | WO 2010/097003 A1 | 9/2010 |

OTHER PUBLICATIONS

Sethom et al., "A New Solution for Micro-Mobility Management in Next Generation Networks" Computers and Electrical Engineering 32, 2006.

Calhoun, Ed., "Control and Provisioning of Wireless Access Points (CAPWAP) Protocol Specification" Network Working Group, Mar. 2009.

"Wireless LAN Controller (WLC) Design and Features FAQ" Cisco 4400 Series Wireless LAN Controllers, Updated Dec. 2010.

Search Report issued in corresponding Chinese Patent Application No. 201110262509.X, dated Apr. 8, 2013.

\* cited by examiner

MESSAGE FORWARDING METHOD, ACCESS POINT, AND SYSTEM

CROSS-REFERENCE TO RELATED APPLICATION

This application claims priority to Chinese Patent Application No. 201110262509.X, filed on Sep. 6, 2011, which is hereby incorporated by reference in its entirety.

FIELD

The present disclosure relates to the wireless access field, and in particular, to a message forwarding method, an Access Point, and a system.

BACKGROUND

An Access Point (Access Point in English, AP for short) is set in a wireless network. Access authentication messages and common service messages of a wireless user are forwarded by the AP. An AP controller (AP Controller in English, AC for short) in the wireless network is configured to control the modes of forwarding the access authentication messages and common service messages on the AP.

The AP forwards a received wireless message in a local forwarding mode or tunnel forwarding mode. In the local forwarding mode, the AP encapsulates the received wireless message to generate an Ethernet message, and then directly forwards the generated message to a destination address. In the tunnel forwarding mode, the AP first encapsulates the received wireless message into an Ethernet message, then encapsulates the encapsulated Ethernet message into a message of the control and provisioning of wireless access points (Control And Provisioning of Wireless Access Points in English, CAPWAP for short) protocol, and sends the encapsulated message of the CAPWAP protocol to the AC. The AC decapsulates the message of the CAPWAP protocol to obtain the Ethernet message, and then forwards the Ethernet message to a destination address.

FIG. 1 is a schematic structural diagram of an existing three-layer network between the AC and the AP. The three-layer network includes user stations (Stations in English, STAs for short), an AP1, an AP2, a switch (Switch), and an AC. In this three-layer network, forwarding modes used by the AP include the local forwarding mode and the tunnel forwarding mode.

In the prior art, as the AP can merely simply forward a received wireless message, when the AP is configured with the local forwarding mode, no message is sent to the AC, resulting in that the AC separately controls wireless air interfaces and user access in the local forwarding mode; when the AP is configured with the tunnel forwarding mode, all wireless messages need to be forwarded to the AC first, resulting in waste of bandwidth between the AP and AC.

SUMMARY

The technical problem to be solved in embodiments of the present disclosure is to identify a received message and determine a corresponding forwarding mode to forward the message.

A first aspect of the present disclosure provides a message forwarding method implemented by an Access Point (AP), where the method includes:

obtaining a forwarding configuration table, where the forwarding configuration table includes message types and forwarding modes;

receiving a message sent by a user station, and obtaining a message type of the message;

determining, a forwarding mode of the message according to the message type of the message and the forwarding configuration table; and encapsulating and forwarding the message according to the forwarding mode of the message.

A second aspect of the present disclosure provides an Access Point (AP), which includes:

a configuration obtaining module, configured to obtain a forwarding configuration table, where the forwarding configuration table includes message types and forwarding modes;

an identification module, configured to obtain a message type of a received message sent by a user station;

a forwarding mode determination module, configured to determine a forwarding mode of the message according to the message type of the message obtained by the identification module and the forwarding configuration table obtained by the configuration obtaining module; and a forwarding module, configured to encapsulate and forward the message according to the forwarding mode of the message obtained by the forwarding mode determination module.

A third aspect of the present disclosure provides a message forwarding system, which includes an Access Point (AP) and an AP controller (AC), where:

the AP is configured to obtain a forwarding configuration table, where the forwarding configuration table includes message types and forwarding modes, and when a message sent by a user station is received, obtain the message type of the message, determine the forwarding mode of the message according to the message type of the message and the forwarding configuration table, encapsulate the message according to the forwarding mode of the message, and when the forwarding mode of the message is a tunnel forwarding mode, forward the message through the AC; and the AC is configured to receive the message encapsulated by the AP according to the tunnel forwarding mode, decapsulate the message, and forward the decapsulated message to a destination address.

Implementing embodiments of the present disclosure has the following benefits:

According to a forwarding configuration table, an Access Point can select different forwarding modes for messages of different types received from wireless users and forward the message, thereby implementing forwarding control of messages of wireless users on the Access Point, and avoiding the problem that wireless air interface control is separated from user access control on the AC in the local forwarding mode and the problem of waste of bandwidth between the AP and the AC in the tunnel forwarding mode, which are caused by failure of the AP to execute different forwarding modes for different messages of wireless users.

BRIEF DESCRIPTION OF THE DRAWINGS

In order to illustrate the technical solutions in the embodiments of the present disclosure or in the prior art more clearly, the accompanying drawings required for describing the embodiments or the prior art are briefly described hereunder. Apparently, the accompanying drawings in the following merely show some of the embodiments of the present disclosure, and persons of ordinary skill in the art may obtain other drawings according to the accompanying drawings without creative efforts.

DETAILED DESCRIPTION OF THE EMBODIMENTS

The technical solutions in the embodiments of the present disclosure are hereinafter described clearly and completely with reference to the accompanying drawings in the embodiments of the present disclosure. Apparently, the described embodiments are only a part rather than all of the embodiments of the present disclosure. Based on the embodiments of the present disclosure, all other embodiments obtained by persons of ordinary skill in the art without creative efforts shall fall within the protection scope of the present disclosure.

Figure 1:
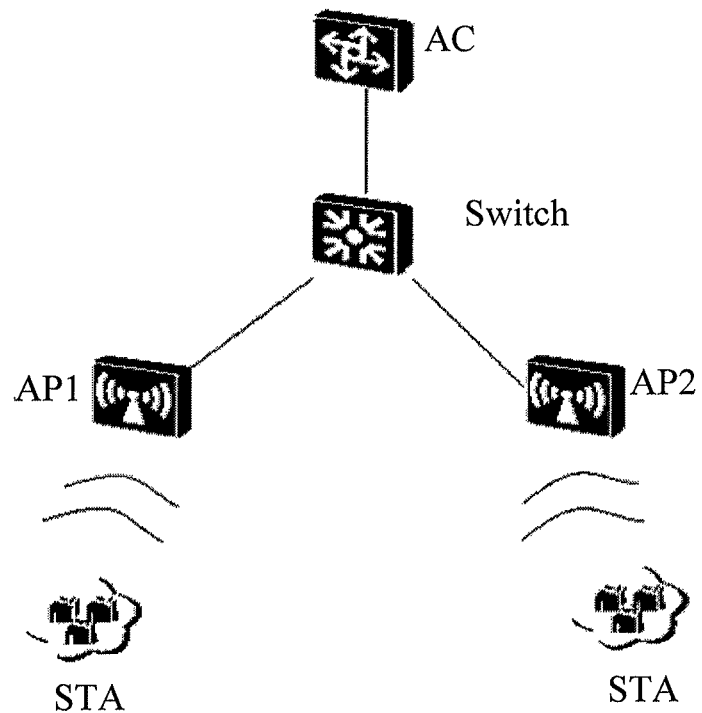
FIG. 1 is a schematic structural diagram of a three-layer network between an AC and an AP in the prior art.
Figure 2:
FIG. 2 is a schematic structural constitutional diagram of a message forwarding system according to an embodiment of the present disclosure.

FIG. 2 is a schematic structural constitutional diagram of a message forwarding system according to an embodiment of the present disclosure. The system includes an Access Point AP1 and an AP controller AC3.

The AP1 is configured to obtain a forwarding configuration table, where the forwarding configuration table includes message types and forwarding modes, and when a message sent by a user station is received, obtain the message type of the message, determine the forwarding mode of the message according to the message type of the message and the forwarding configuration table, encapsulate the message according to the forwarding mode of the message, and forward the message through the AC3 or directly forward the message to a destination address.

The messages received by the AP1 from the user station include access authentication messages, common service messages, and address request messages of wireless users.

The AP1 may obtain the forwarding configuration table delivered by the AC3, or obtain the forwarding configuration table set on the AP1 by a user. The configuration table includes message types and forwarding modes of the messages.

In particular, the access authentication messages correspond to a tunnel forwarding mode; the common service messages correspond to a local forwarding mode, and the address request messages of wireless users correspond to a tunnel forwarding mode.

The access authentication messages include 802.1x authentication messages and portal authentication messages.

When the forwarding mode corresponding to a message received by the AP1 from the user station is the tunnel forwarding mode, the AP1. encapsulates the message into an Ethernet message, then encapsulates the encapsulated Ethernet message into a message of the CAPWAP protocol, and sends the encapsulated message of the CAPWAP protocol to the AC3. The AC3 decapsulates the message of the CAPWAP protocol to obtain the Ethernet message, and then forwards the Ethernet message to a destination address. When the forwarding mode corresponding to a message received by the AP1 from the user station is the local forwarding mode, the AP1 encapsulates the common service message into an Ethernet message, and directly forwards the Ethernet message to the destination address.

Figure 3:
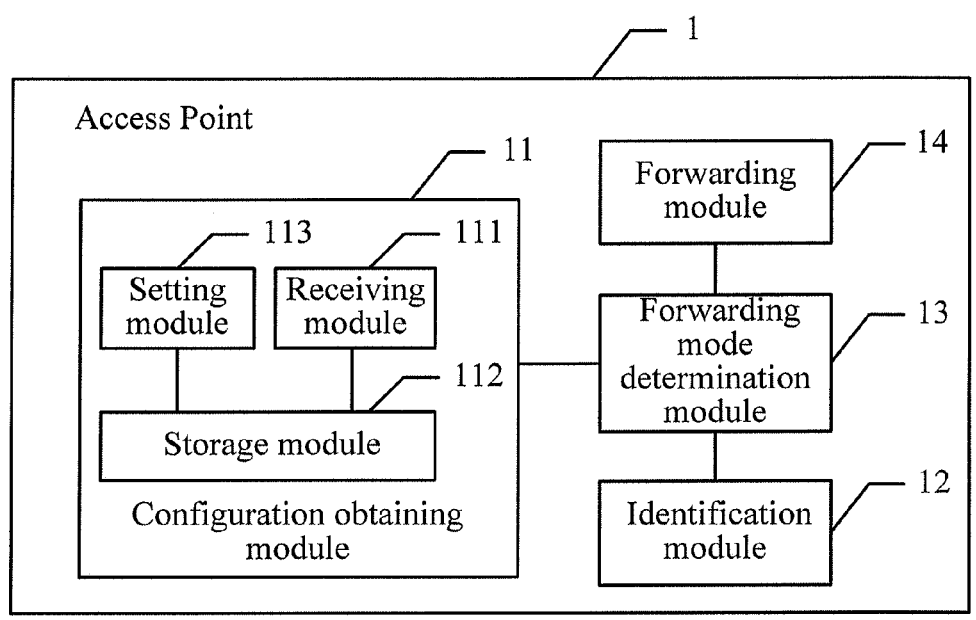
FIG. 3 is a schematic structural constitutional diagram of an Access Point according to an embodiment of the present disclosure.

FIG. 3 is a schematic structural constitutional diagram of an Access Point according to an embodiment of the present disclosure. The AP1 may specifically include a configuration obtaining module 11, an identification module 12, a forwarding mode determination module 13, and a forwarding module 14.

The configuration obtaining module 11 is configured to obtain a forwarding configuration table, where the forwarding configuration table includes message types and forwarding modes.

In particular, the configuration obtaining module 11 may obtain configuration information directly configured by a user on the AP to obtain the forwarding configuration table, or receive the forwarding configuration table delivered by the AC3 through the CAPWAP tunnel to the AP1 for performing forwarding control of corresponding messages.

The identification module 12 is configured to obtain a message type of a received message sent by a user station.

When a message sent by a wireless user by using a user station is received, the identification module 12 identifies the message, obtains the type of the message, and determines whether the message is an access authentication message, a common service message, or an address request message of the wireless user.

The forwarding mode determination module 13 is configured to determine a forwarding mode of the message according to the message type of the message obtained by the identification module 12 and the forwarding configuration table obtained by the configuration obtaining module 11.

In particular, the access authentication messages correspond to the tunnel forwarding mode; the common service messages correspond to the local forwarding mode, and the address request messages of wireless users correspond to the tunnel forwarding mode.

The forwarding mode determination module 13 may search the forwarding configuration table for the forwarding mode corresponding to the message type of the message obtained by the identification module 12, and then notify the forwarding module 14 of the forwarding mode.

The forwarding module 14 encapsulates and forwards the message according to the forwarding mode of the message obtained by the forwarding mode determination module 13.

In particular, if the type of the message is the access authentication message, the forwarding module 14 encapsulates the access authentication message into an Ethernet message, then encapsulates the encapsulated Ethernet message into a message of the CAPWAP protocol, and sends the encapsulated message of the CAPWAP protocol to the AC3, and the AC3 decapsulates the message of the CAPWAP protocol to obtain the Ethernet message, and then forwards the Ethernet message to a destination address, where the access authentication message includes an 802.1x authentication message and a portal authentication message. If the type of the message is the common service message, the forwarding module 14 encapsulates the common service message into an Ethernet message, and then directly forwards the generated message to a destination address, where the common service message includes a common data message. If the type of the message is the address request message of a wireless user, the forwarding module 14 encapsulates the address request message of the wireless user into an Ethernet message, then encapsulates the encapsulated Ethernet message into a message of the CAPWAP protocol, and sends the encapsulated message of the CAPWAP protocol to the AC3, and the AC3 decapsulates the message of the CAPWAP protocol to obtain the Ethernet message, and forwards the Ethernet message to the destination address, where the address request message of the wireless user includes a message of the dynamic host configuration protocol (Dynamic Host Configuration Protocol in English, DHCP for short).

Further, as shown in FIG. 3, the configuration obtaining module 11 of the AP1 may specifically include:

a receiving module 111, configured to obtain the forwarding configuration table delivered by the AC3; and a storage module 112, configured to store the forwarding configuration table received by the receiving module 111.

Further, the configuration obtaining module 11 of the AP1 may include a setting module 113, configured to obtain the forwarding configuration table set by a user on the Access Point. The setting module 113 may provide the user a user interface for setting the message types and the forwarding modes of the messages to obtain the forwarding configuration table set by the user for the AP, and then the storage module 112 stores the forwarding configuration table. According to actual requirements, the user may use a selection module to select one of the forwarding configuration table delivered by the AC3 and the forwarding configuration table set by the user that are stored by the storage module 112, so that the forwarding mode determination module 113 can determine a forwarding mode of a corresponding message type.

Definitely, in other embodiments, the AP1 may merely include the receiving module 111 to receive the forwarding configuration table delivered by the AC3, or merely include the setting module 113 to obtain the forwarding configuration table set by the user.

Based on the description of the embodiment, the present disclosure has the following advantages.

According to a forwarding configuration table, an Access Point can select different forwarding modes for messages of different types received from wireless users and forward the messages, thereby implementing forwarding control of messages of wireless users on the Access Point, and avoiding the problem that wireless air interface control is separated from user access control on the AC in the local forwarding mode and the problem of waste of bandwidth between the AP and the AC in the tunnel forwarding mode, which are caused by failure of the AP to execute different forwarding modes for different messages of wireless users.

A message forwarding method of the present disclosure is described in detail below.

Figure 4:
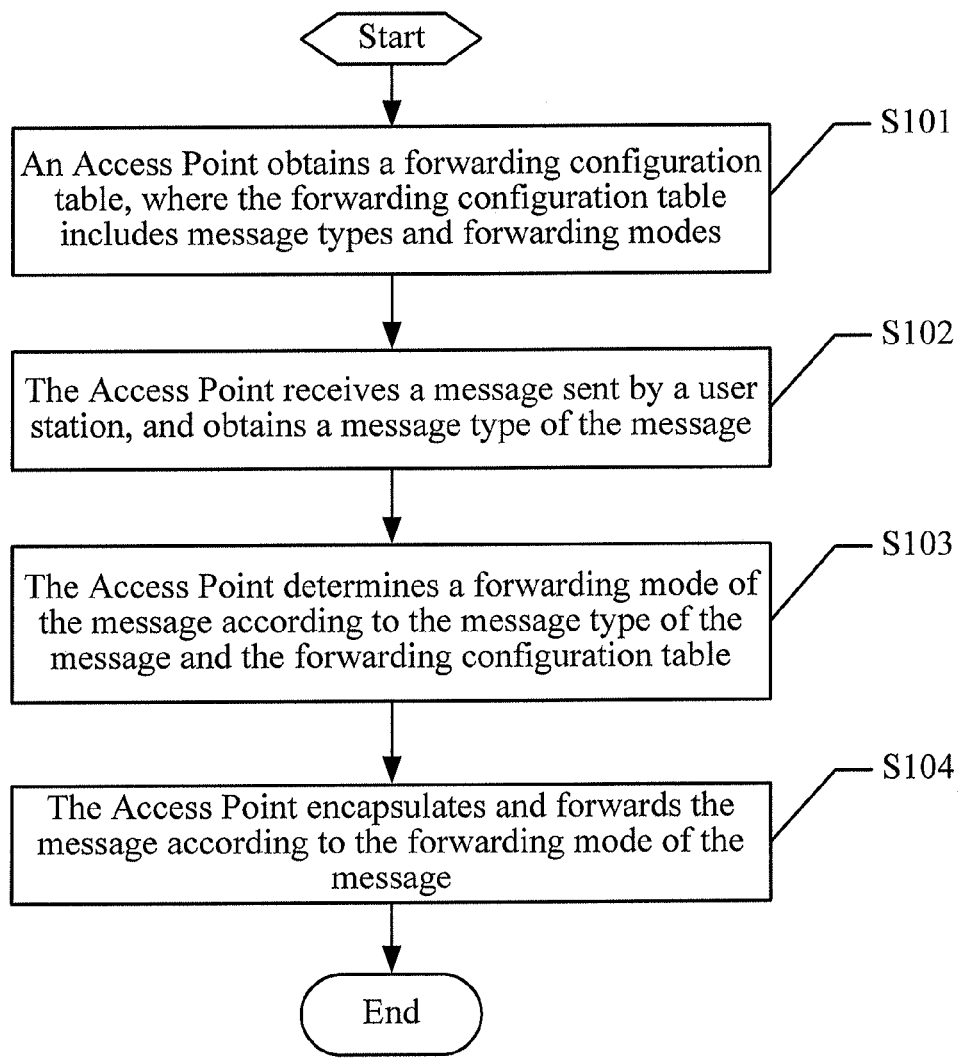
FIG. 4 is a schematic flowchart of a message forwarding method according to an embodiment of the present disclosure.

FIG. 4 is a schematic flowchart of a message forwarding method according to an embodiment of the present disclosure. The message forwarding method according to the embodiment includes the following steps.

S101: An Access Point obtains a forwarding configuration table, where the forwarding configuration table includes message types and forwarding modes.

The Access Point obtaining the forwarding configuration table may specifically include: obtaining the forwarding configuration table delivered by an AP controller, or obtaining the forwarding configuration table set by a user on the Access Point. The AP controller may deliver the forwarding configuration table through a control tunnel of a CAPWAP tunnel.

The message types may include access authentication messages, common service messages, and address request messages of wireless users.

In particular, the access authentication messages correspond to a tunnel forwarding mode; the common service messages correspond to a local forwarding mode, and the address request messages of wireless users correspond to a tunnel forwarding mode.

S102: The Access Point receives a message sent by a user station, and obtains a message type of the message.

When a message sent by a wireless user by using a user station is received, the Access Point identifies the message, obtains the type of the message, and determines whether the message is an access authentication message, a common service message, or an address request message of the wireless user.

S103: The Access Point determines a forwarding mode of the message according to the message type of the message and the forwarding configuration table.

The Access Point may search the forwarding configuration table obtained in S101 for the forwarding mode corresponding to the message type of the message obtained in S102.

S104: The Access Point encapsulates and forwards the message according to the forwarding mode of the message.

According to the forwarding mode determined in S103, the Access Point forwards the received message sent by the user station.

In particular, if the type of the message is the access authentication message, the Access Point encapsulates the access authentication message into an Ethernet message, then encapsulates the encapsulated Ethernet message into a message of the CAPWAP protocol, and sends the encapsulated message of the CAPWAP protocol to the AC, and the AC decapsulates the message of the CAPWAP protocol to obtain the Ethernet message, and then forwards the Ethernet message to a destination address, where the access authentication message includes an 802.1x authentication message and a portal authentication message. If the type of the message is the common service message, the Access Point encapsulates the common service message into an Ethernet message, and then directly forwards the generated message to the destination address, where the common service message includes a common data message. If the type of the message is the address request message of a wireless user, the Access Point encapsulates the address request message of the wireless user into an Ethernet message, then encapsulates the encapsulated Ethernet message into a message of the CAPWAP protocol, and sends the encapsulated message of the CAPWAP protocol to the AC, and the AC decapsulates the message of the CAPWAP protocol to obtain the Ethernet message, and forwards the Ethernet message to the destination address, where the address request message of the wireless user includes a DHCP message.

Based on the description of the embodiment, the present disclosure has the following advantages.

According to a forwarding configuration table, a wireless access point can select different forwarding modes for messages of different types received from wireless users and forward the messages, thereby implementing forwarding control of messages of wireless users on the Access Point, and avoiding the problem that wireless air interface control is separated from user access control on the AC in the local forwarding mode and the problem of waste of bandwidth between the AP and the AC in the tunnel forwarding mode, which are caused by failure of the AP to execute different forwarding modes for different messages of wireless users.

Persons of ordinary skill in the art should understand that all or part of the steps in the method according to the embodiments may be accomplished by a computer program instructing relevant hardware. The program may be stored in a computer readable storage medium. When the program runs, the program executes the steps of the method specified in the embodiments. The storage medium may be a magnetic disk, an optical disk, a read-only memory (Read-Only Memory, ROM), or a random access memory (Random Access Memory, RAM).

The above descriptions are merely exemplary embodiments of the present disclosure, but the protection scope of the present disclosure is not limited thereto. Therefore, equivalent variations derived according to the claims of the present disclosure shall fall within the protection scope of the present disclosure.

What is claimed is:

1. A message forwarding method implemented by an Access Point (AP), comprising:
   obtaining a forwarding configuration table, wherein the forwarding configuration table comprises message types and corresponding forwarding modes;
   receiving a message sent by a station, and obtaining a message type of the message;
   determining, according a forwarding mode of the message corresponding to the message type of the message; and
   encapsulating and forwarding the message according to the forwarding mode of the message;
   wherein the message types in the forwarding configuration table comprise an access authentication message, a common service message, and an address request message of a wireless user; and wherein
   the access authentication message corresponds to a tunnel forwarding mode;
   the common service message corresponds to a local forwarding mode; and
   the address request message of the wireless user corresponds to the tunnel forwarding mode.

2. The method according to claim 1, wherein the obtaining the forwarding configuration table comprises:
   obtaining the forwarding configuration table delivered by an AP controller.

3. The method according to claim 1, wherein the obtaining the forwarding configuration table comprises:
   obtaining the forwarding configuration table set by a user on the AP.

4. The method according to claim 1, wherein the access authentication message comprises at least one of an 802.1x authentication message and a portal authentication message.

5. An Access Point (AP), comprising:
   a configuration obtaining module, configured to obtain a forwarding configuration table, wherein the forwarding configuration table comprises message types and corresponding forwarding modes;
   an identification module, configured to obtain a message type of a received message sent by a station;
   a forwarding mode determination module, configured to determine a forwarding mode of the message corresponding to the message type of the message according to the forwarding configuration table; and
   a forwarding module, configured to encapsulate and forward the message according to the forwarding mode of the message;
   wherein the message types in the forwarding configuration table comprise an access authentication message, a common service message, and an address request message of a wireless user; and wherein
   the access authentication message corresponds to a tunnel forwarding mode;
   the common service message corresponds to a local forwarding mode; and
   the address request message of the wireless user corresponds to the tunnel forwarding mode.

6. The AP according to claim 5, wherein the configuration obtaining module comprises:
   a receiving module, configured to receive the forwarding configuration table from an AP controller; and
   a storage module, configured to store the forwarding configuration.

7. The AP according to claim 5, wherein the configuration obtaining module comprises:
   a setting module, configured to obtain the forwarding configuration table set by a user on the Access Point; and
   a storage module, configured to store the forwarding configuration table.

8. A message forwarding system, comprising an Access Point (AP) and an AP controller (AC), wherein:
   the AP is configured to obtain a forwarding configuration table, wherein the forwarding configuration table comprises message types and corresponding forwarding modes, receive a message sent by a station, obtain a message type of the message, determine a forwarding mode of the message corresponding to the message type of the message according to the forwarding configuration table, encapsulate the message according to the forwarding mode of the message, and, when the forwarding mode of the message is a tunnel forwarding mode, forward the message through the AC; and
   the AC is configured to receive the message encapsulated by the AP according to a tunnel forwarding mode, decapsulate the message, and forward the decapsulated message to a destination address;
   wherein the message types in the forwarding configuration table comprise an access authentication message, a common service message, and an address request message of a wireless user; and wherein
   the access authentication message corresponds to a tunnel forwarding mode;
   the common service message corresponds to a local forwarding mode; and
   the address request message of the wireless user corresponds to the tunnel forwarding mode.

9. The message forwarding system according to claim 8, wherein the AP is configured to obtain the forwarding configuration table delivered by the AC.

10. The message forwarding system according to claim 8, wherein the AP is configured to obtain the forwarding configuration table set by a user on the AP.

* * * * *